US008915172B1

(12) United States Patent
Hood

(10) Patent No.: US 8,915,172 B1
(45) Date of Patent: Dec. 23, 2014

(54) MAGNETIZED FENCE WITH INTEGRAL STOCK FEEDER FOR DECKED SAWS

(71) Applicant: Dale Turner Hood, Wimberley, TX (US)

(72) Inventor: Dale Turner Hood, Wimberley, TX (US)

( * ) Notice: Subject to any disclaimer, the term of this patent is extended or adjusted under 35 U.S.C. 154(b) by 0 days.

(21) Appl. No.: 13/925,823

(22) Filed: Jun. 24, 2013

(51) Int. Cl.

| | |
|---|---|
| ***B26D 1/18*** | (2006.01) |
| ***B26D 7/06*** | (2006.01) |
| ***B23D 47/04*** | (2006.01) |

(52) U.S. Cl.
CPC .................................... *B23D 47/045* (2013.01)
USPC ............................................ 83/446; 83/477.2

(58) Field of Classification Search
CPC .......... B27B 27/00; B27B 27/02; B27B 27/08
USPC ................... 3/446, 477.2; 83/446, 477.2, 440
See application file for complete search history.

(56) References Cited

U.S. PATENT DOCUMENTS 5,293,802 A * 3/1994 Shiotani et al. .............. 83/468.7
6,076,873 A * 6/2000 Jung ............................ 294/65.5
7,012,495 B2 3/2006 Underwood
8,604,900 B2 12/2013 Kocijan
2008/0271583 A1* 11/2008 Chuang ........................... 83/438
2011/0017040 A1* 1/2011 Folov .............................. 83/446
2012/0204688 A1* 8/2012 Rowe ................................ 83/13
2013/0320686 A1* 12/2013 Morton ........................ 294/65.5

FOREIGN PATENT DOCUMENTS

WO WO2010020006 A1 * 2/2010 ............. B27B 19/00

* cited by examiner

*Primary Examiner* — Kenneth E. Peterson
*Assistant Examiner* — Samuel A Davies
(74) *Attorney, Agent, or Firm* — Guy Cumberbatch

(57) ABSTRACT

The invention herein named "Magnetized Fence with Stock Feeder for Decked Saws" is in total manifestation a table saw fence or other saw fence magnetized for resistance to lifting, in combination with a stock feeder or powerful spring-loaded workpiece guide mounted directly on said fence. Thus the stock feeder, which advances workpieces over the cutting element of a saw, can be used without its mounting apparatus interfering with lateral travel of the fence.

Said invention is comprised of a: 1) saw fence, which guides workpieces, 2) motorized feeder with mounting apparatus, or spring-loaded guide, and 3) mechanisms incorporated for switching the magnetic element.

19 Claims, 5 Drawing Sheets

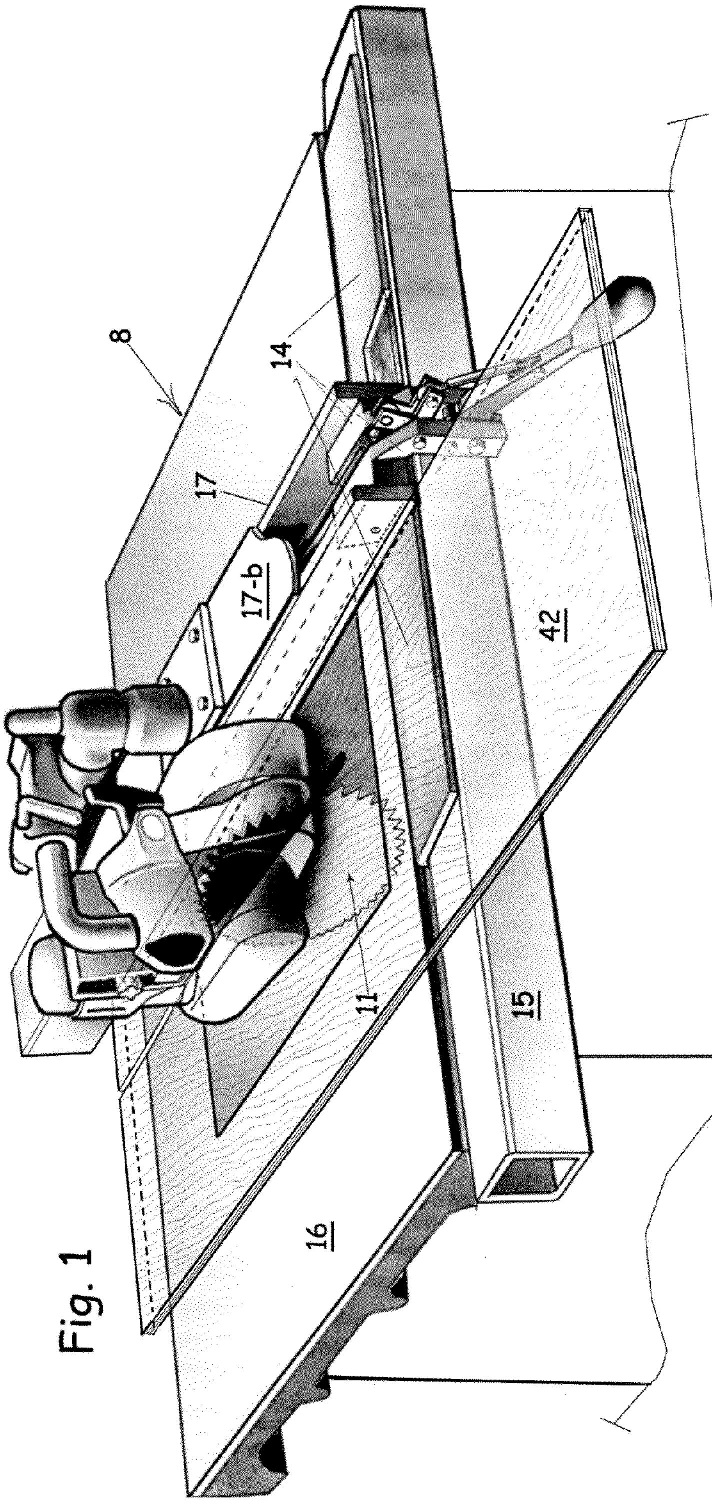
Fig. 1
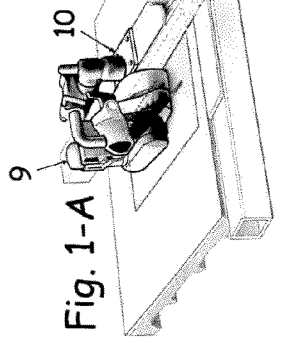
Fig. 1-A
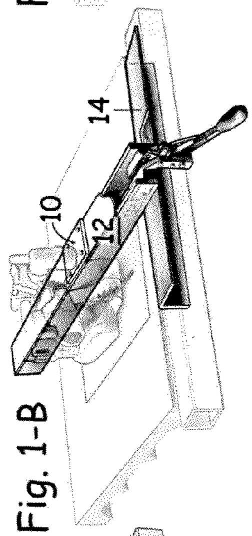
Fig. 1-B
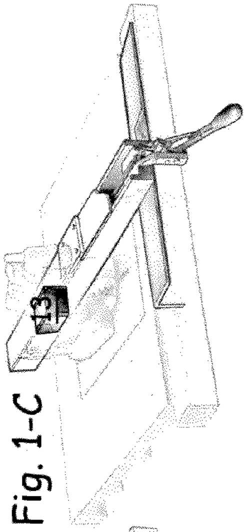
Fig. 1-C

MAGNETIZED FENCE WITH INTEGRAL STOCK FEEDER FOR DECKED SAWS

FIELD AND SCOPE

The background of related machines, devices, and practices in the use of table and/or other saws having a deck, or support surface, on which a workpiece is placed to be cut.

BACKGROUND OF THE INVENTION

This statement will restrict any lengthy elaboration in defining what a table saw is, or how it is used, as the reader can be spared this redundancy. Suffice it to state, a table saw is a machine, or body of a machine of convenient height, having a flat deck, or support surface, on which a workpiece is rested while being cut by a blade, or dada set, or other cutting tool, projecting through the deck from below, and powered in most instances by an electric motor. In this statement "table saw" will be the assumed machine with which the invention is utilized, although use with other types, such as bandsaws and inverted routers, would be practicable. Further, "blade" will include any and all cutters; and it is implied that workpieces of materials other than wood can be involved.

The most common operation performed on a table saw is the rip cut, wherein an element known as the "fence" is secured to the saw so as to be adjustable in its lateral spatial relation to the blade, allowing the operator to select the width of workpiece to be removed from one which is wider. The objective is to keep the stock, or workpiece, tight against the fence so as to produce a straight uniform cut, and prevent danger arising from the work drifting away from said fence, thus becoming bound up and resulting in a violent reversal of movement. This is the situation that results most commonly in an injury to the operator. Therefore there are many devices, or prior art, put forth in the field that address these hazards, many of high merit.

The workpiece is advanced over the blade manually unless propelled by a power feeder. The use of a power feeder, or stock feeder, allows greater accuracy and safety, and its position can be biased, or "crabbed" to impart lateral force, pressing the workpiece tightly against the fence. However, the mounting of a power feeder on the deck of the saw restricts the lateral travel of the fence, and so limits the width of material that can be cut. Thus it is set aside often because of inconvenience, and the re-installation deferred for various reasons. The purpose and advantage of the present invention is to facilitate the use of guides or feeders mounted directly on the fence, thus eliminating the restriction of lateral movement of the fence, and increasing the convenience and safety of such operations.

The "T-square" style fence is today most widely used, as it can be attached as an after-market accessory to most saws, and is now supplied by numerous makers. These fences have many merits, and accomplish good results when used by an operator with sufficient skills; but suffer one common deficiency, to wit, the distal end is not fastened to the deck of the saw. This condition makes it vulnerable to loss of alignment from rough handling of materials, and precludes the use of the invention(s) herein described, in that the downward force of a stock feeder, or any non-motorized spring-loaded workpiece guide of substantial force, would simply lift the distal end of the fence. These fences lock into position laterally by use of a cam at the front, in a cross-head, tightening onto a rail by the downward movement of a handle. The basic body of one of these has been used in the development of the invention(s)

herein described, as the inventor desired to retain the cam-locking feature, which also becomes an essential element in the invention.

PRIOR ART

After conducting searches available through the USPTO and a website accessing the European database, the inventor found no results particularly related to this invention. Herein are cited patents relevant to some of the elements of the invention:

PATENT CITATIONS:

| Cited Pat. | Filing Date | Publication Date | Applicant | Title |
|---|---|---|---|---|
| 7,930,959 | May 2005 | Apr. 26, 2011 | Greene | Table Saw Accessory |
| 4,206,910 | Jun. 28, 1978 | Jun. 10, 1980 | William Biesemeyer | Table Saw Fence System |
| 4,976,298 | May 17, 1990 | Dec. 11, 1990 | Gibson | Anti-kickback Hold-down Device |
| 6,360,641 | Jun. 6, 2000 | Mar. 26, 2002 | Talesky, et. al, | Rip Fence with Dual Locking Mechanism |

SUMMARY OF THE INVENTION

In response to the objectionable aspects of the use of fences and feeders noted above, the present invention combines the two tools, or elements, into an integrated tool consisting of a feeder, or powerful spring-loaded workpiece guide, mounted directly on the body of the fence, said fence being firmly held to the deck of the saw with a switchable magnet or electromagnet.

DESCRIPTION OF THE DRAWINGS

FIG. 1: The set of drawings on this page provide a perspective overview showing a stock feeder directly attached to a typical "T-square" saw fence as intended. FIG. 1. is enlarged to provide clarity, the table saw (8) shown with a workpiece (42) being cut by the blade (11). In FIG. 1-A the feeder (9) is shown, attached to the mounting plate (10) on the fence (12). Here the feeder is represented as one of several similar models available from tool suppliers, and a spring-loaded non-motorized guide is not shown, nor is a proprietary feeder developed for this specific application, both of which would be enabled to successful function by the essence of the invention. In FIG. 1-B the entire fence assembly (12) is seen with emphasis on the cross-head (14), in the center of which is the cam-locking element in this type of fence, the locking accomplished by the rail (15) being gripped between the cam and cross-head when the handle is lowered. FIG. 1-C clarifies the position of the magnetic element (13) as installed. FIG. 1 is preferred as a cover illustration.

FIGS. 2-A and 2-B are enlargements of the main drawing. The parts and reference numbers will be addressed in the detailed description.

FIGS. 3, 3-A and 3-B provide elevation views of the assembly in section to clarify the spatial relations of the elements in the auto-locking mechanism and the entire assembly in relation to the table saw on which it is being used.

FIG. 4 is provided to enhance understanding of the locking action of this type of fence at the cross-head.

FIGS. 5 and 6 focus on the magnetic assembly near the distal end of the fence assembly. The details will be elaborated in the detailed description.

FIGS. 7, 7-A and 7-B are provided as elevations of the non-automatic version of the magnetized fence, wherein the operator manually activates the magnet by turning the knob one-half revolution.

LIST OF REFERENCE NUMBERS

Figure 2:
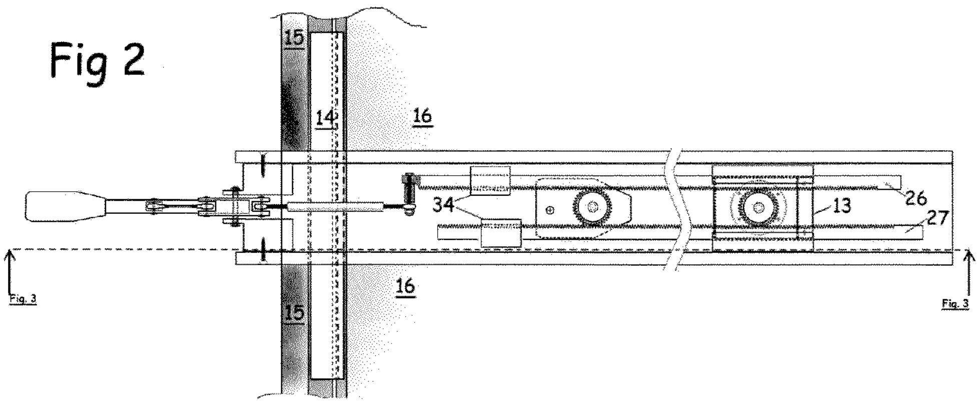
FIG. 2: Here is presented the fence as developed to automatically lock the magnetic element, in plan, illustrating the relative positions of handle, clamping head, gears and racks, and the magnetic element.
Figure 2:
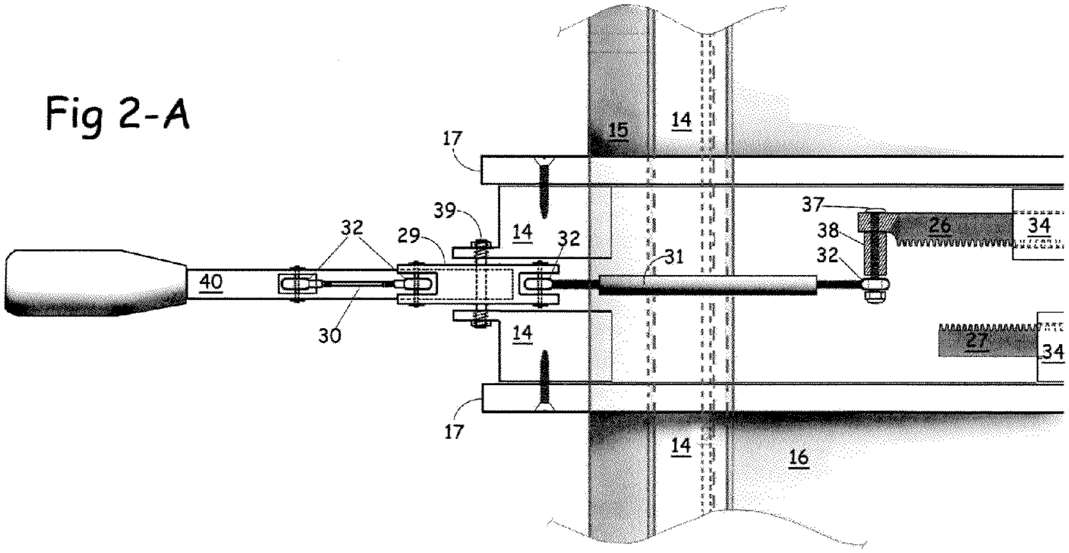
Figure 2:
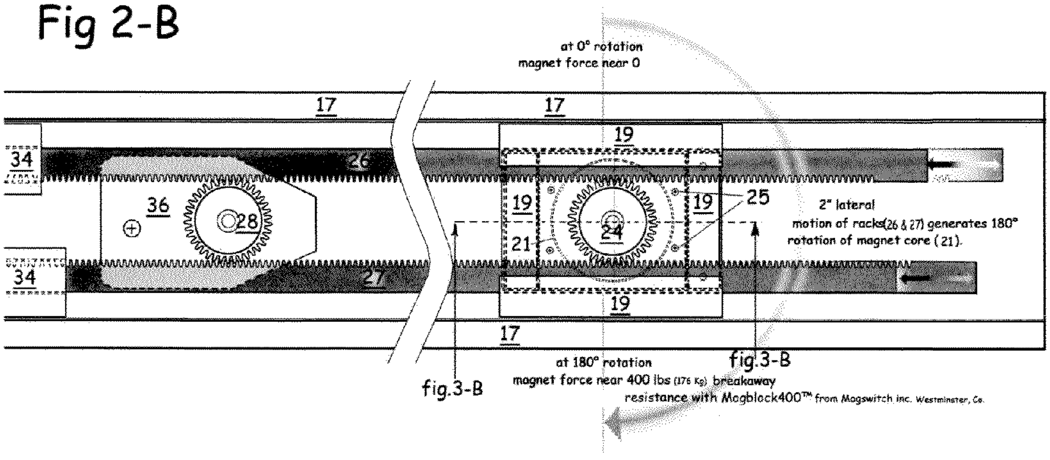

8. Typical Table Saw
9. Typical Feeder
10. Feeder Mounting Plate
11. Saw Blade
12. Entire Fence Assembly
13. Magnet and sleeve assay
14. Cross-Head of Fence
15. Rail
16. Deck of Saw
17. Housing
17-*b*. Roof of Housing
18. Floor of Housing
19. Sleeve
19-*b*. Magnet Block
20. Lift Springs
21. Magnet Core
22. Lift Plate
23 Hold-down Screws
24. Primary Gear
25. Original Cap Screws
26. Primary Rack
27. Secondary Rack
28. Idler Gear
29. Bell-crank
30. Connecting-rod #1
31. Connecting-rod #2
32. Swivel Rod-ends
33. Manual Switching Knob
34. Guide Blocks
35. Idler Shall
36. Idler Block
37. Offset Pin
38. Offset Spacer
39. Bell-crank Axle
40. Handle
41. Cam Paddle-clip
42. Workpiece

THE DETAILED DESCRIPTION

As previously mentioned, this invention(s) has been developed to allow the direct mounting of a stock feeder or spring-loaded workpiece guide on a conventional "T-square" style fence for reasons of safety, convenience, freedom of movement, and improved performance and efficiency.

Any person skilled in the art of fabrication, precise measuring, cutting of various materials accurately, drilling and tapping, layout, and associated skills, can built this invention, given access to materials, tools, and supplied with the elements involved. To begin, one must have or construct a body, or housing (17), together with an attached clamping head (14), so comprising a "T-square" type table saw fence. It is highly preferred to use such a body, or housing, in that its dimensions, being a standard 2"×3" square tubing, provide adequate space for the magnet and the elements of the mechanism to be assembled. Those skilled in the art will appreciate that larger housings could be utilized to accommodate more powerful magnetic elements, or smaller ones for lighter duty, and that the present invention could be susceptible to variations or modifications other than those specifically described, and it is to be understood that the present invention encompasses all such variations that fall within its spirit and scope.

Figure 3:
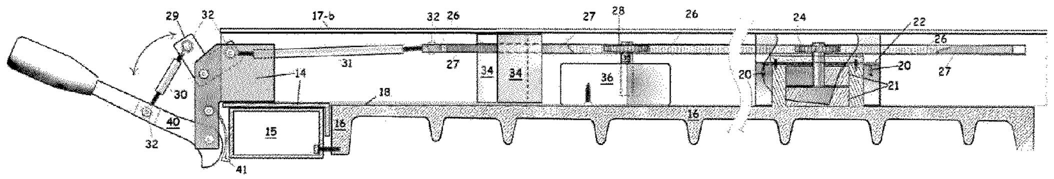
FIG. 3.
Figure 3:
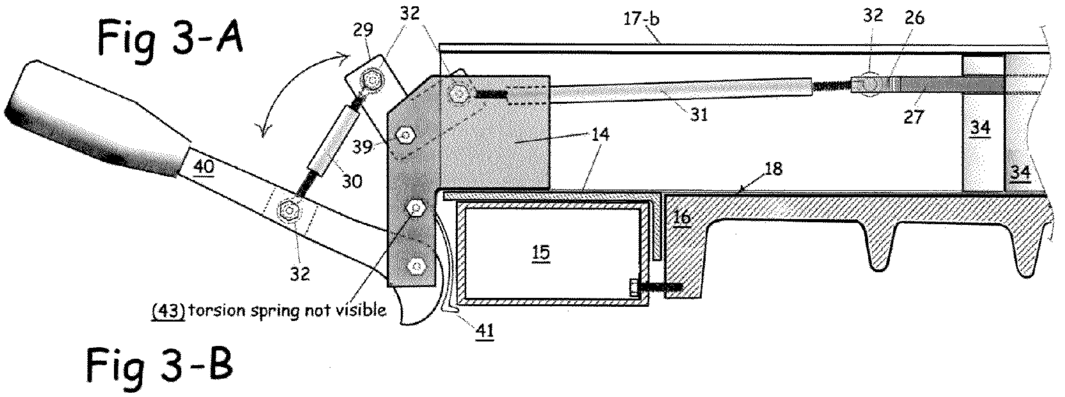
Figure 3:
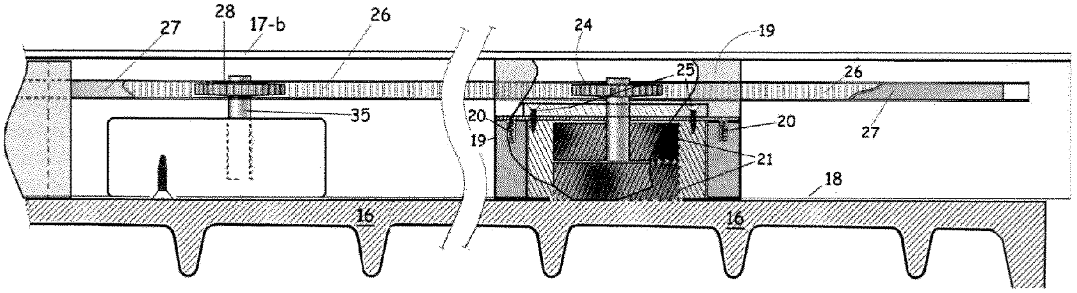
Figure 7:
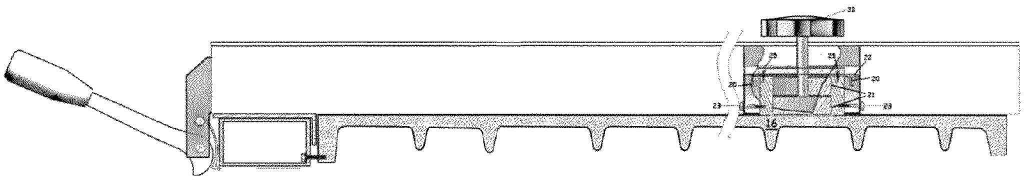
FIG. 7.
Figure 7:
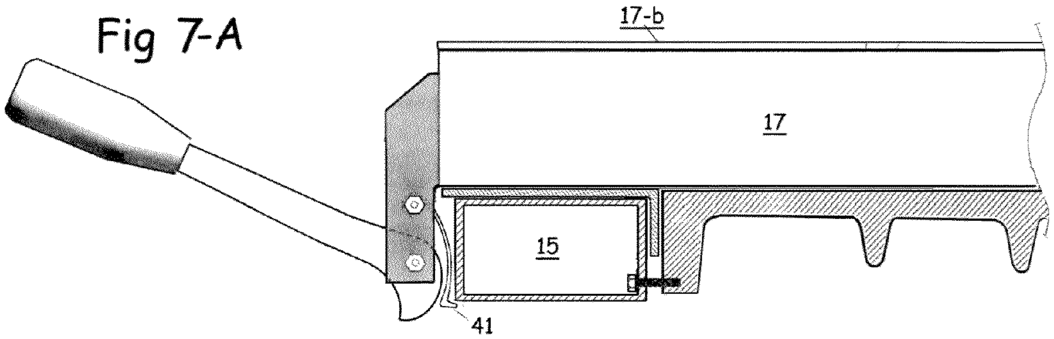
Figure 7:
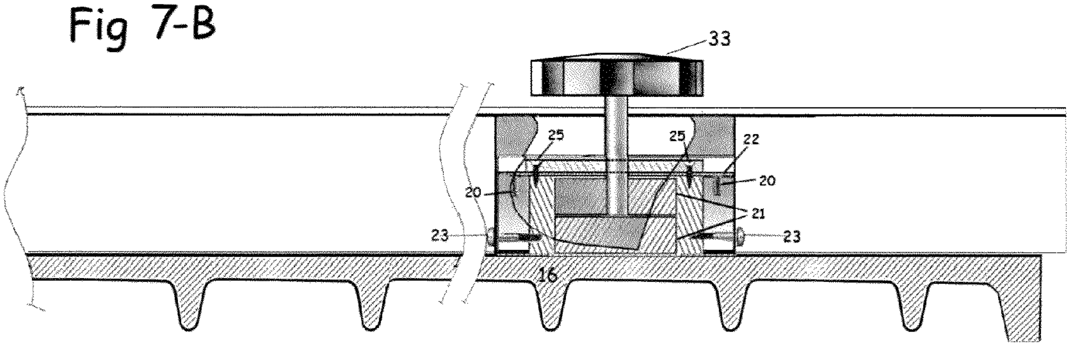

A switchable magnet manufactured by the Magswitch™ company of Westminster, Colo., using the remarkable new magnetic metallurgy, was chosen for use in this prototype for its appropriate dimensions and effective holding power, which is 176 kg. (400 pounds) when activated in contact with substantial ferrous material. The next design task was to install said magnet (19-*b*) near the distal end of the housing (17) in such a way that it is permitted no movement or rotation except a slight ability to be lifted away from the deck (16) of the saw by small lift springs (20), so as not to be sliding in contact with the deck (16) when not activated, and the operator is moving the entire assembly in lateral motion. Moreover, the materials providing this restriction of movement must be of a non-magnetic nature, as the magnetic field when activated extends in all directions. To accomplish this a close-fitting sleeve (19) was fabricated of phenolic plate ½" (12.7 mm) thick and secured to the floor of the housing (18) by drilling and countersinking screw-holes in the floor (18) of the housing (17), and tapping threaded holes into the underside of the sleeve to receive flat-head 10/24 machine screws. A rectangular hole, or port, is cut in said floor, as seen in FIG. 3-B, permitting full contact of the magnetic unit (19-*b*) with the deck of the saw when activated. The contact areas between the magnet body and the inner surfaces of the sleeve are well greased upon assembly. The magnet as supplied is equipped with a T-handle for activation when the automatic mechanism is not installed. In FIG. 7 is indicated a knob (33) to be used, replacing the T-handle for more comfort.

For the preferred embodiment, this handle, found to be epoxy-glued onto threads which were at the top of the shaft that turns the magnet's core (21), was removed and replaced with the primary spur gear (24) obtained from McMaster-Cat-™, catalog #6325K71, by some machining and the use of a tension pin passing through the gear and the shaft. This gear was chosen for its appropriate dimensions and durability. As the switching of the magnet requires a rotation of 180 degrees, with this gear that rotary motion translates to 50 mm. (2") of travel along the root of the teeth. This distance transfers into the linear motion of the racks (26, 27) as required, which is imparted to said racks from the downward motion of the fence handle (40), through the bell-crank (29) and connecting rods (30, 31). Said racks are found at McMaster-Cam™, catalog #6295K13. Thus by graphic calculation the distance of the pivot-points of the rod ends (32) from the rotational center of the bell-crank was determined, as was the distance of the rod-end of connecting rod #2 (31) from the axis of the cam. In the prototype the bell-crank was made of phenolic also, but could be of other materials. Likewise, the swiveling rod-ends on connecting rods could be replaced with clevises, such variations not defeating claims made here. Fine tuning the timing of the switching of the magnet relative to the locking of the cam is readily done by adjusting the length of either of the connecting rods where they have threaded rod-ends (32) (McMaster-Carry™ 60645K111). The clamping head (14) must square up the fence to the rail (15) a moment before the magnet is activated, which occurs when the magnet's core (21) is rotated 180 degrees. Thus, at about 80 degrees of downward swing of the handle (40), the clamping to the rail is accomplished. 90 degrees of downward swing yields two inches (50 to 52 mm.) of rack travel, which yields 180 degrees of rotation of the magnet's core (21). In the nature of the switchable magnet, as it approaches activation at about 150 degrees, it urges rotation to finish the motion. In the non-automatic version the operator simply turns a knob (33) (in FIG. 7-B) a half turn after having clamped the cross-head (14) to the rail (15).

As readily seen in the drawings, two racks were required to defeat any binding torque on the magnet in its sleeve, the secondary rack (27) pushing on the primary gear (24) diametrically opposed to the primary rack (26), which pulls. The two racks pass through guide blocks (34) so as to be held in close engagement with the gears (24, 28) and parallel to one another, the guides being two layers of ½" or equivalent phenolic with grooves facing inward to form the guide's channel, glued or screwed together. The guides are attached to the floor of the housing in the same manner as the sleeve. At the primary gear the racks are likewise held in engagement by being trapped in grooves in the sidewalls of the sleeve (19). The secondary, or idler gear (28), which transmits force to the secondary rack (27) is mounted on a shaft (35) which is projected up from its idler block (36), and this block is fastened to the floor of the housing with a single screw to permit the gear to self-align. A good stable hardwood with varnish is appropriate. These features are best recognized in FIG. 2-A. Guide blocks (34) are made of phenolic, the best choice of material, as it is self-lubricating, machines well, and is extremely stable and durable. A person fabricating an example of this invention should mill the channels of the guides and sleeve that entrap the racks to allow freedom of sliding movement without excess loose play, and add a bit of grease. It will be readily seen that the idler block (36) would be easily replaced with another magnetic element, thus doubling the holding power.

The primary rack (26), which pulls, was ground and drilled to accept an offset pin (37) having a spacer (38) to bring the linear force in closer alignment to the bell-crank (29). Said bell-crank (29) is linked to the primary rack (26) by connecting rod #2 (31) with the use of a swiveling rod-end (32). Connecting rod #1 (30) has a similar rod-end pivoting in the bell-crank (29), whose axle (39, FIG. 2-A) is above the handle's axle, then transfers the motion to the handle (40).

Figure 4:
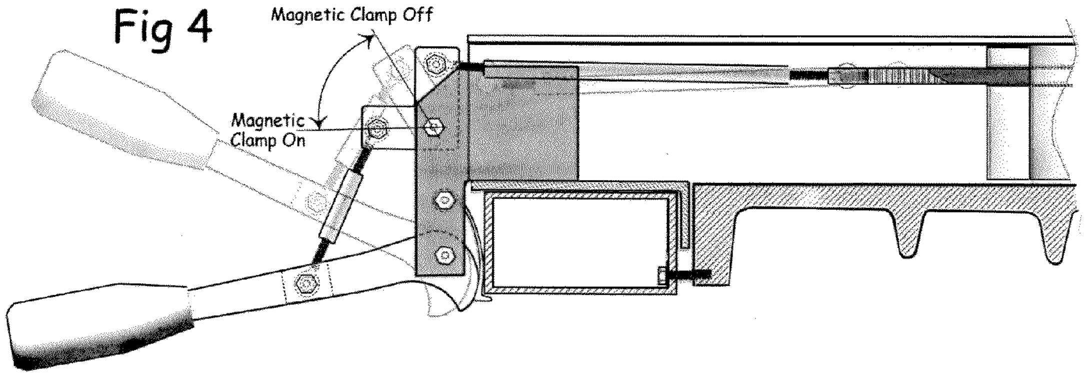
FIG. 4.

Please observe in FIG. 3, 3-A, and FIG. 4, the cam paddle-clip (41), which is always present in various makes of T-square fences, acting as a pressure buffer and wear plate between the cam and the rail. Here it has been modified to include a small amount of hook, so that when the fence is locked the hook reaches under the rail (15), ensuring that the front section and cross head of the fence are also positively prevented from being lifted. To ensure the ease of removal and re-installation of the entire fence to and from the rail, this paddle-clip is held against the cam of the handle by a small torsion spring at its axis, providing clearance in the unlocked position.

Please observe in FIG. 3, 3-A, and FIG. 4, the cam paddle-clip (41), which is always present in various makes of T-square fences, acting as a pressure buffer and wear plate between the cam and the rail (15). Here it has been modified to include a small amount of hook, so that when the fence is locked the hook reaches under the rail (15), ensuring that the front section and cross head of the fence are also positively prevented from being lifted. To ensure the ease of removal and re-installation of the entire fence to and from the rail, this paddle-clip is held against the cam of the handle by a small torsion spring at its axis, providing clearance in the unlocked position.

Figure 5:
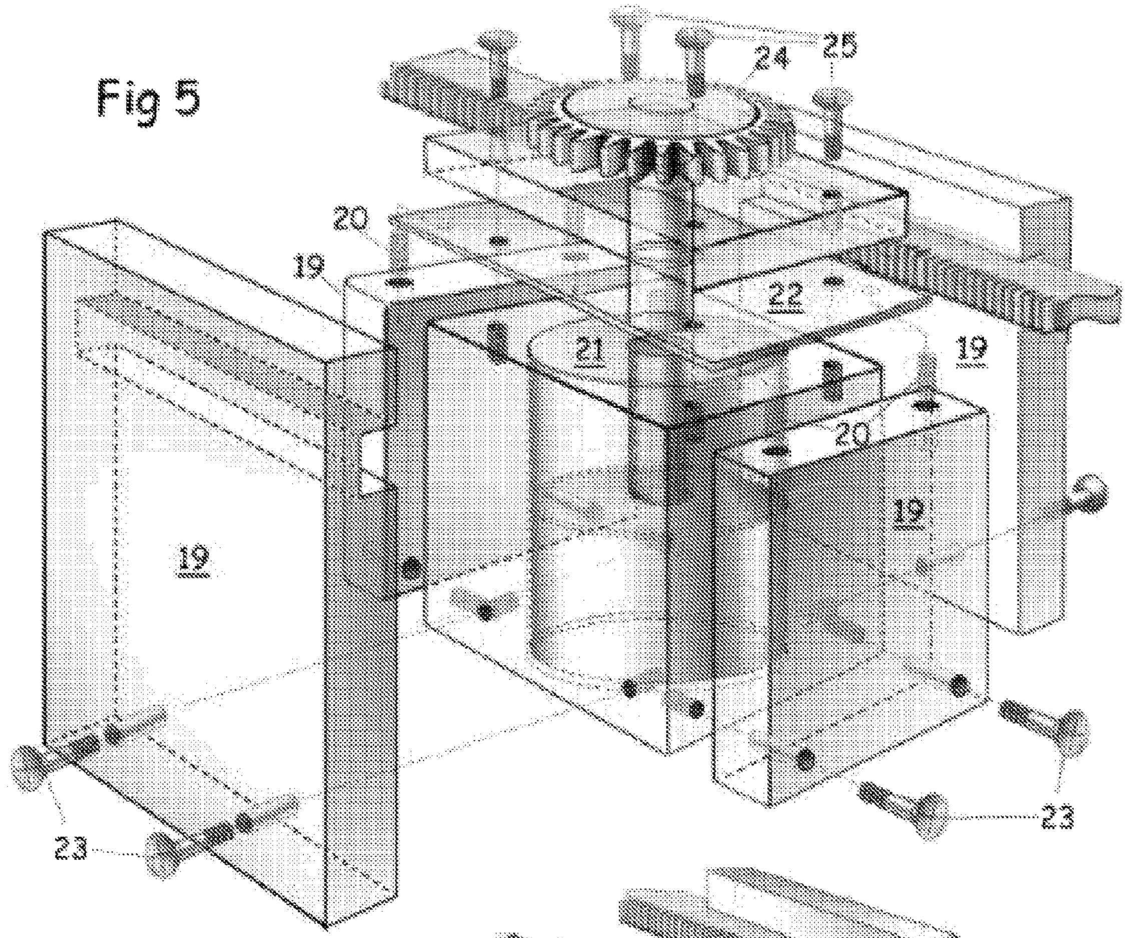
FIG. 5, FIG. 6.
Figure 6:
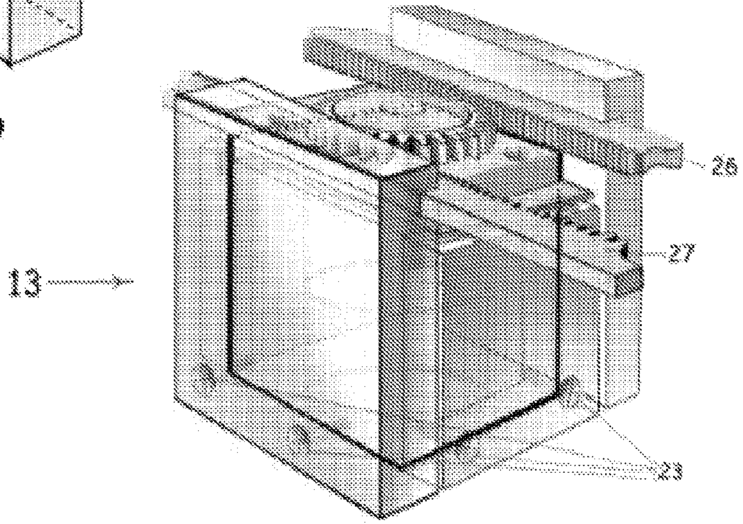

FIGS. 5 and 6 were provided to allow the reader an exploded view that clarifies the features of the magnet and sleeve assembly (13). In FIG. 5, the hold-down screws (23) are seen going through loose holes in the sleeve (19) and into threaded holes in the exterior shell of the magnet block (19-*b*), thus allowing the lift springs (20) to push the lift plate (22) up, which was inserted between the cap of the magnetic block and its body, enough to lift the block away from the saw's deck (25) a few 1/1000's of an inch, or 0.4 mm., so that it isn't in sliding contact with the saw's deck (16) when the operator moves the fence. The lift plate simply projects out over the end walls of the sleeve (19), and is made of stiff galvanized sheet steel, but could be of other suitable materials. The lift plate is installed between the cap and main body of the magnetic block (19-*b*), said cap being held on by the original screws (25). The hold-down screws (23), of course, are to prevent the fence from being lifted, transferring the holding power of the magnet (19-*b*) to the sleeve (19), and thus to the entire housing (17).

FIGS. 7, and 7-A and 7-B, are illustrative of the non-automatic magnetized fence, showing the knob (33) attached to the shaft of the magnet's core (21) instead of the primary gear used in the automatic embodiment. The magnet-sleeve assembly (13) remains the same.

With the mechanism complete and in good working order, the top, or roof (17-*b*), of the housing was reattached to the housing (17), with the stock feeder's mounting base bolted to the feeder mounting plate (10) near to the axis of the saw-blade's arbor, to avail the operator the maximum availability of reach provided by the feeder's mounting apparatus. This re-attachment was accomplished by providing additional sidewalk to the housing made of ½" hardwood plywood, which are necessarily taller than those of the tubing that comprised the housing (17), due to the vertical dimension of the magnetic element (19-*b*). Tabs were welded onto the original steel roof and tapped so as to receive countersunk screws from the outside of the added walls. In production the dependence on the plywood as structure would be eliminated.

At this stage the power stock feeder was assembled to its mounting base and the entire prototype was put into use, working flawlessly in many repeated trials, i.e., downward pressure was applied on the workpiece of more-than-sufficient force needed to obtain traction and propel the workpiece over the blade, with no indication of failure, even when downward pressure was emphasized at the maximum distance from the fence allowed by the mounting apparatus of the stock feeder being used.

Of course all things physical have limits, and the user would do well to exercise caution and common sense in the setup and testing of any machinery. It is recommended that a builder or user of this invention conduct a test, with the saw blade retracted downward from any projection above the deck, then applying sufficient downward pressure on the guide or feeder to, in the case of non-motorized guides, obtain traction sufficient for good results, or in the case of a motorized feeder, obtain sufficient traction to propel the workpiece, without any threat of dislodging the magnetic element.

From the description above, a number of advantages become evident. The reader will see the improved facility in the use of saw fences and feeders, and the enhanced efficiency of the operator. Variations or modifications of elements and/or mechanisms described herein shall not affect the value and novelty of the invention. Thus, the scope of the invention should be determined by the appended claims and not limited to the preferred embodiment illustrated.

The invention claimed is:

1. An apparatus, comprising:

a "T-square" table saw fence having an elongated main body with a proximal end and a distal end and adapted to be secured to a table saw top parallel to a saw blade thereon, the fence having a cam-actuated clamp with a handle on the proximal end for securing the proximal end of the fence to the table saw top, the fence also comprising an ON/OFF switchable magnet actuated by rotation of one magnet with respect to another and mounted within the main body near the distal end, wherein when switched ON the switchable magnet secures the distal end of the fence to the table saw top, the fence further including a mechanism inside the main body configured to switch the switchable magnet ON simultaneous with movement of the handle when actuating the cam-actuated clamp, the mechanism further configured to switch the switchable magnet OFF upon reverse movement of the handle when de-actuating the cam-actuated clamp and releasing the proximal end of the fence from the table saw top; and wherein the mechanism comprises a spur gear connected to rotate with a core of the switchable magnet and two linear rack gears with teeth in meshing engagement with opposite sides of and for rotating the spur gear, wherein movement of the handle linearly displaces the rack gears in opposite directions via a linkage.

2. An apparatus according to claim 1, wherein the switchable magnet includes small lift springs that lift the switchable magnet away from the table saw top so as to prevent sliding contact of the switchable magnet with the table saw top when the switchable magnet is OFF and facilitate lateral movement over the table saw top.

3. An apparatus according to claim 1, further comprising a manual actuator mounted on the main body of the fence configured to switch the magnet on and off.

4. An apparatus according to claim 1, further comprising a motorized power feeder directly mounted to the main body of the fence provided with positional adjustments.

5. An apparatus according to claim 1, further comprising a spring-loaded workpiece guide directly mounted to the main body of the fence provided with positional adjustments.

6. An apparatus according to claim 1, wherein full movement of the handle to fully actuate the cam-actuated clamp linearly displaces the rack gear a sufficient distance to rotate the core of the switchable magnet 180°.

7. An apparatus according to claim 1, wherein the switchable magnet is mounted for vertical movement within a non-magnetic sleeve fixed to the fence main body.

8. An apparatus according to claim 1, wherein the main body comprises a rectangular tube having a cross-head at the proximal end which may be locked onto a guide rail of the table saw top by the downward motion of the handle, said handle rotating a cam and effecting clamping pressure of the cross-head on the rail at a selected lateral position as desired by the operator.

9. An apparatus according to claim 8, further comprising a hook on a cam-paddle of the cam-actuated clamp which positively locks the cross-head firmly down on the rail when the cam-actuated clamp is actuated.

10. An apparatus according to claim 9, further comprising a return torsion-spring connected to the hook to maintain it against the cam-actuated clamp.

11. An apparatus, comprising:

a table saw fence having an elongated main body with a proximal end and a distal end and adapted to be secured to a table saw top parallel to a saw blade thereon, the fence having a locking clamp actuated by a handle on the proximal end for securing the proximal end of the fence to the table saw top, the fence also comprising an ON/OFF switchable magnet actuated by rotation of a core magnet with respect to another magnet and mounted within the main body near the distal end, wherein when switched ON the switchable magnet secures the distal end of the fence to the table saw top, the handle being connected to linkages which linearly displace a pair of rack gears inside the main body of the fence in opposite directions which in turn engage and rotate a spur gear mounted to rotate with the core magnet to switch the magnet ON or OFF simultaneous to movement of the handle.

12. An apparatus according to claim 11, wherein the switchable magnet is mounted for vertical movement within a non-magnetic sleeve fixed to the fence main body.

13. An apparatus according to claim 11, wherein the switchable magnet includes small lift springs that lift the switchable magnet away from the table saw top so as to prevent sliding contact of the switchable magnet with the table saw top when the switchable magnet is OFF and facilitate lateral movement over the table saw top.

14. An apparatus according to claim 11, further comprising a manual actuator mounted on the main body of the fence configured to switch the magnet on and off.

15. An apparatus according to claim 11, further comprising a motorized power feeder directly mounted to the main body of the fence provided with positional adjustments.

16. An apparatus according to claim 11, further comprising a spring-loaded workpiece guide directly mounted to the main body of the fence provided with positional adjustments.

17. An apparatus according to claim 11, wherein the main body comprises a rectangular tube having a cross-head at the proximal end which may be locked onto a guide rail of the table saw top by the downward motion of a handle, said handle rotating a cam and effecting clamping pressure of the cross-head on the rail at a selected lateral position as desired by the operator.

18. An apparatus according to claim 17, further comprising a hook on a cam-paddle of the cam-actuated clamp which positively locks the cross-head firmly down on the rail when the cam-actuated clamp is actuated.

19. An apparatus according to claim 18, further comprising a return torsion-spring connected to the hook to maintain it against the cam-actuated clamp.

* * * * *